United States Patent [19]
Kneip

[11] Patent Number: 4,976,804
[45] Date of Patent: Dec. 11, 1990

[54] EXPANDABLE TIRE BUILDING DRUM

[75] Inventor: Fernand Kneip, Diekirch, Luxembourg

[73] Assignee: The Goodyear Tire & Rubber Company, Akron, Ohio

[21] Appl. No.: 347,584

[22] Filed: May 5, 1989

[51] Int. Cl.⁵ .................. B29D 30/24; B29D 30/32
[52] U.S. Cl. .................................. 156/401; 156/415; 156/420
[58] Field of Search ............... 156/398, 401, 403, 415, 156/416, 420

[56] References Cited

U.S. PATENT DOCUMENTS

| | | | |
|---|---|---|---|
| 3,644,162 | 2/1972 | Appleby et al. | 156/415 |
| 3,867,231 | 2/1975 | Casey | 156/415 |
| 4,010,058 | 3/1977 | Kubinski et al. | 156/415 |
| 4,220,494 | 9/1980 | Kawaida et al. | 156/415 |
| 4,226,656 | 10/1980 | Appleby et al. | 156/401 |
| 4,521,269 | 6/1985 | Ozawa | 156/420 |

FOREIGN PATENT DOCUMENTS 1563342 3/1980 United Kingdom .

*Primary Examiner*—Joye L. Woodard
*Attorney, Agent, or Firm*—T. P. Lewandowski; Frederick K. Lacher

[57] ABSTRACT

A segmental drum (1) has a plurality of circumferentially spaced drum segments (28) radially movable by a set of links (36) pivotally connected to a pair of axially movable hub assemblies (34) slidably mounted on a drum shaft (12). Each of the segments (28) has a cylindrical center portion (30) and end portions (32) with recesses providing pockets (68) for the tire bead portions. The links (36) are positioned between the end portions (32) providing space for large bead portions in the pockets (68) and at the same time the segments (28) are retractable to a small diameter to facilitate placing of a tire band (64) over the drum (10).

8 Claims, 3 Drawing Sheets

EXPANDABLE TIRE BUILDING DRUM

BACKGROUND OF THE INVENTION

1. Field of the Invention

This invention relates generally, as indicated, to an expandable tire building drum and especially to a tire casing finishing drum for small diameter tires such as radial aircraft tires. During building of tires of this type a relatively small diameter annular band of reinforcing plies is placed over the drum requiring a small diameter of the drum in the retracted condition. The band is initially expanded after which the beads are placed and the drum expanded to seat the beads in the bead pockets. Because of the number of reinforcing plies in the annular band, substantial force is required to expand the band and seat the beads. Also the size of the bead pockets must be sufficient to accommodate the substantial number of plies wrapped around the beads.

2. Description of the Prior Art

Tire building drums used heretofore for passenger tires have not been suitable for building radial aircraft tires because the air pressure actuated cam mechanism has not provided sufficient force to expand the casing and seat the beads. Where links have been used to expand a tire building drum, separate sets of links have been required to expand the center segments of the drum and the bead supporting fingers at the shoulders of the drum. This mechanism has been satisfactory for relatively large diameter tires; however, it is not usable with a small diameter tire of the radial aircraft type where the bead portions are so large there is no room for placing the expanding and contracting linkage under the bead supports.

SUMMARY OF THE INVENTION

The present invention is directed to an expandable drum construction in which the bead support pockets for the bead portions are in the end portions of the drum segments and the expanding and contracting linkage is positioned between the end portions so that the drum can be retracted to a minimum diameter. Also the pockets may be of a sufficient size to accommodate the large bead portions because no linkage is positioned under the bead support pockets.

A center sleeve of resilient sheet material extends around the center portions of the drum segments and may have openings in communication with a source of vacuum and air pressure to assist in removing the finished casing from the drum by air pressure and assist in holding the annular tire band on the drum by a vacuum. Sloped surfaces on the hub assemblies and end portions of the segments adjacent the pivotal connections to the links limit the swinging movement of the links and control the drum diameter in the contracted and expanded conditions. The sloped surfaces also hold the links in the retracted condition at an angle to the shaft axis so that the force necessary to start the expansion of the drum segments is within a reasonable range. Inflatable end sleeves are mounted over inflatable turnup bladders on bladder support members adjacent the ends of the segments and also extend over the end portions of the segments at the bead pockets to facilitate turnup of the edges of the annular band around the beads. With this tire building drum radial aircraft tires may be finished in a first stage operation so that the resulting tire casing is ready for shaping and application of the belt and tread in a second stage operation.

In accordance with an aspect of this invention there is provided a radially expandable tire building drum for building a small diameter tire with large bead portions comprising a rotatable hollow shaft mounted on a supporting structure, a pair of hub assemblies slidably mounted on the shaft for axial movement on opposite sides of a centerplane of the drum, a plurality of circumferentially spaced drum segments positioned radially outward of the shaft, a set of links pivotally connected to the hub assemblies and to the drum segments, bladder support members adjacent opposite ends of the drum segments, a center sleeve of resilient material extending around the drum segments, bottom turnup bladders mounted on the bladder support members, a right-hand-/left-hand screw disposed coaxially in the shaft, nut members in threaded engagement with the left-hand portion and right-hand portion of the screw and being connected to the hub assemblies for moving the hub assemblies in opposite directions relative to the centerplane upon rotation of the screw, each of the links being movable between a generally axial position and a generally radial position to selectively expand and retract the drum segments, each of the drum segments having a center portion and end portions, each of the end portions having a radially outer surface with a recess in the surface for a bead pocket at each end of the drum and means to seat the large bead portions in the pocket at each end of the drum upon expansion of the center portions and the end portions of the drum segments by movement of the set of links.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the spirit and scope of the invention defined in the claims hereof.

DESCRIPTION OF THE PREFERRED EMBODIMENT

Figure 1:
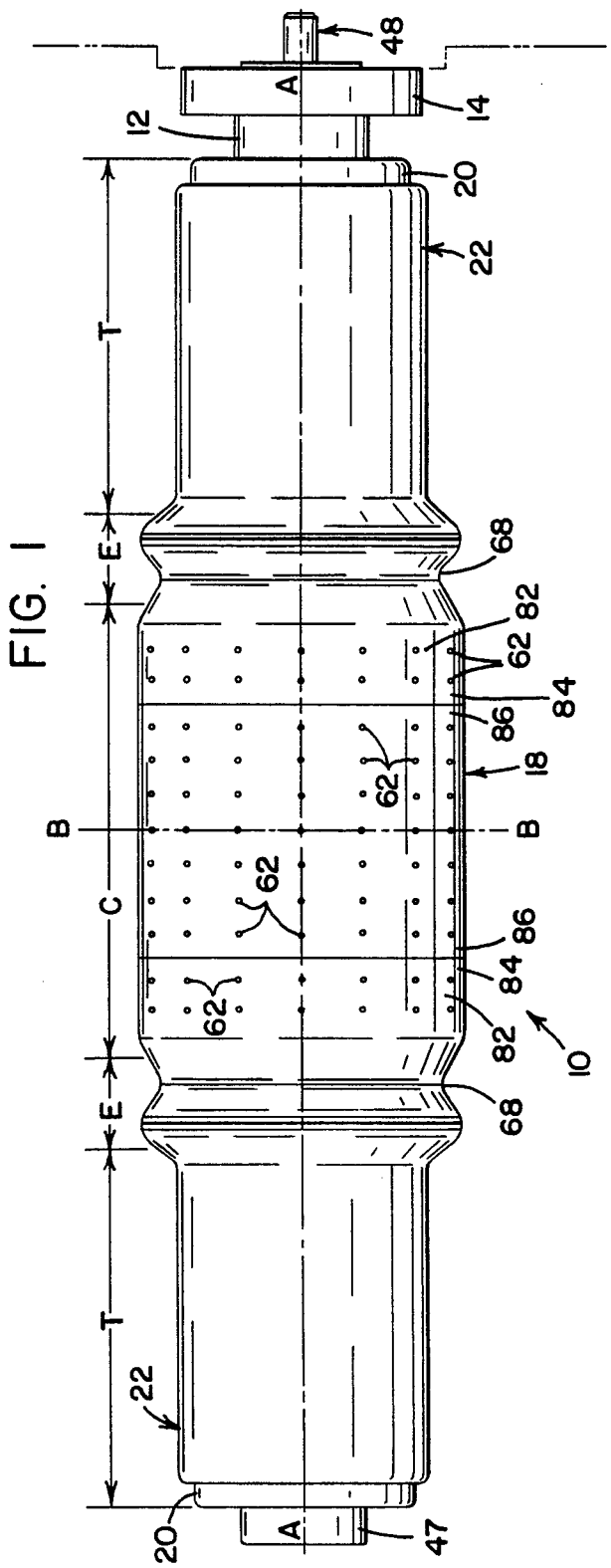
FIG. 1 is a longitudinal elevation of a tire building drum embodying the invention.
Figure 2:
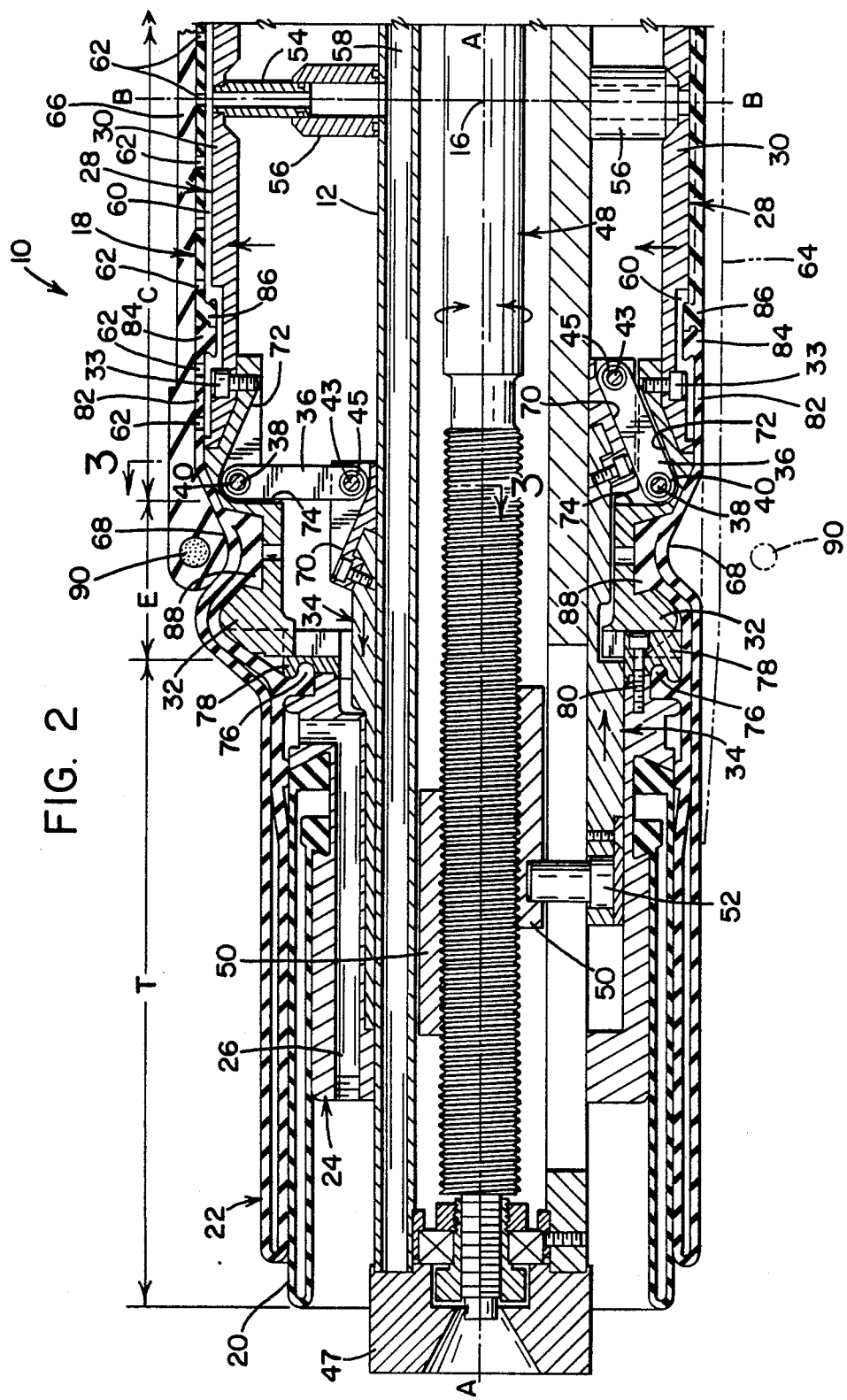
FIG. 2 is an enlarged axial cross-sectional view of the left-hand side of the drum of FIG. 1 shown in an expanded state in the part of the view above the drum axis and in a retracted state in the part of the view below the drum axis.
Figure 3:
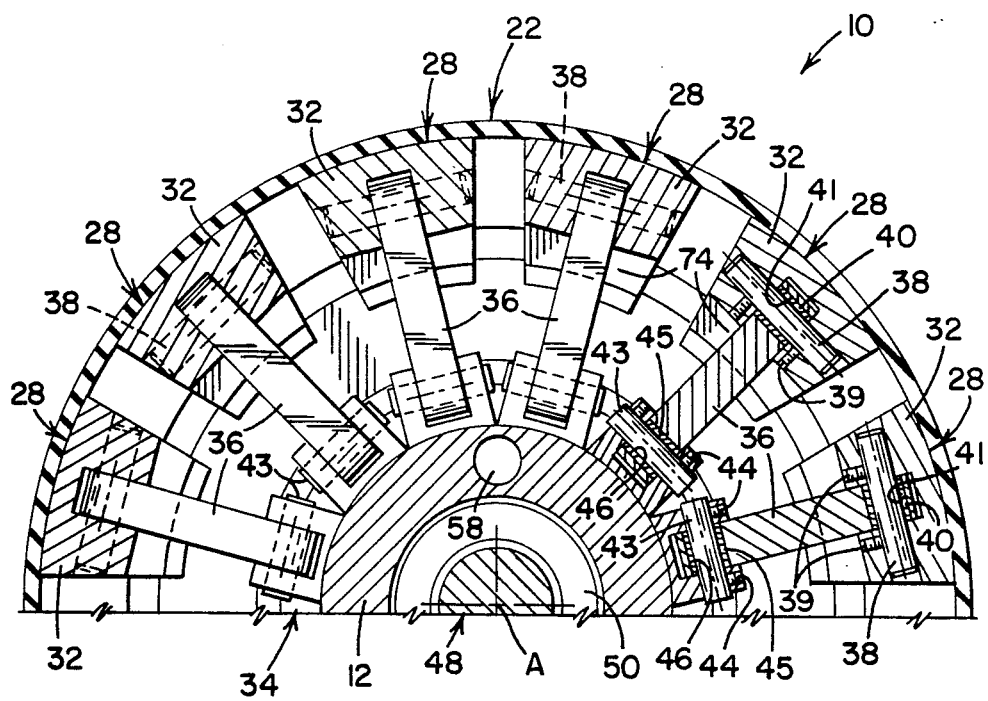
FIG. 3 is a radial cross section taken along the plane of line 3—3 in FIG. 2 with parts being broken away to show the pivotal connections of the links to the drum segments and hub assembly.

Referring to FIGS. 1, 2 and 3, a tire building drum 10 for finishing tire casings is shown having a rotatable hollow shaft 12 which may have a flange 14 for mounting on a hub of a suitable drive shaft (not shown). The shaft 12 is rotatable about an axis A—A and the drum 10 has a centerplane B—B which is perpendicular to the shaft axis A—A at a midpoint 16 of the shaft 12. The drum 10 has a central section C disposed symmetrically with respect to the centerplane B—B and end sections E,E at the edges of the drum. Adjacent respective end sections E,E and extending axially outward therefrom are turnup sections T,T. A center sleeve 18 of resilient material is wrapped around the central section C. An inflatable resilient bottom turnup bladder 20 and an inflatable resilient top turnup bladder 22 are wrapped around a bladder support member such as bladder support cylinder 24 mounted on the shaft 12. Air passages 26 in the bladder support cylinder 24 are in communication with a suitable source of air pressure (not shown) for inflating the bottom bladder 20 and top turnup bladder 22 at each end of the drum 10.

A plurality of circumferentially spaced drum segments 28 are positioned radially outward of the shaft 12 at the central section C for radial movement from an expanded condition of the drum 10 shown in the upper half of FIG. 2 to the retracted condition of the drum shown in the lower half of FIG. 2. Each of the segments 28 has a center portion 30 and end portions 32 fastened to the center portion as by screws 33. The end portions 32 are pivotally connected to a pair of hub assemblies 34 slidably mounted on the shaft 12 by a set of links 36. Each of the links 36 has a pivotal connection to one of the end portions 32 where an outer pin 38 is fastened to the end portion by stud screws 39 threaded in the end portion and extends through a bushing 40 held in hole 41 in the link. An inner end of each of the links 36 is pivotally connected to one of the hub assemblies 34 by an inner pin 43 fastened to the hub assembly by stud screws 44 at the radially inner end of the link and extending through a bushing 45 in a hole 46 in the link.

An outboard end cap 47 is mounted on the outboard end of the shaft 12 and rotatably supports a right-hand-/left-hand screw 48 positioned inside the hollow shaft 12 and extending through the flange 14 to a shaft connection (not shown) in the supporting structure. The screw 48 may be connected to a suitable drive means for rotating the screw in opposite directions such as a reversible D C motor (not shown). A nut member 50 is rotatably threaded on the screw 48 at each end of the drum 10 and is connected to one of the hub assemblies 34 by a connecting pin 52 so that upon rotation of the screw, each nut member will move axially and cause one of the hub assemblies to move axially. As shown in FIG. 2, the nut member 50 in the upper half of the drawing has been moved to the left causing one of the hub assemblies 34 to move to the left carrying the inner pin 43 to the left for rotating the links 36 to a generally radial position causing expansion of the drum segments 28 and full expansion of the drum 10. As shown in the bottom half of FIG. 2, the nut member 50 has been moved to the right causing one of the hub assemblies 34 to move to the right carrying the inner pin 43 to the right whereupon each of the links 36 is rotated to a generally axial position causing retraction of the drum segments 28 and full retraction of the drum 10.

The center portion 30 of each of the segments 28 is fastened to a rod 54 slidably mounted in a housing 56 carried by the shaft 12. The rod 54 for some of the segments 28 may be hollow and in communication with a passage 58 in the shaft wall which in turn is in communication with sources of air pressure and vacuum. The center portion 30 of each of the drum segments 28 has channels 60 in communication with holes 62 in the center sleeve 18 and each top turnup bladder 22. The rod 54 and housing 56 guide the center portion 30 of each of the segments 28 maintaining the segments in a centered position relative to the center plane B—B of the drum 10. By communicating vacuum to the holes 62 in the center sleeve 18 and in the top turnup bladder 22, an annular tire band 64, shown in phantom lines in the bottom half of FIG. 2, may be held in position on the drum 10. By communicating air pressure to the holes 62, a finished tire casing 66, shown in the upper half of FIG. 2, may be separated from the drum 10 after the building operation and retraction of the drum segments 28.

As shown in FIGS. 2 and 3, the links 36 are positioned between the end portions 32 in such a manner that upon movement of the hub assemblies 34 toward the centerplane B—B, the links are moved out of the space under the end portions. This makes possible the provision of large recesses such as bead pockets 68 in the outer surfaces of the end portions 32 of each of the drum segments 28.

Adjacent the pivotal connection of each of the links 36 to one of the hub assemblies 34 at the inner pin 43 is a sloped surface 70 which is engageable by one of the links in the retracted condition of the drum 10 as shown in the bottom half of FIG. 2. Adjacent the pivotal connections of each of the links 36 to each of the end portions 32 at the outer pin 38 is a sloped surface 72. The sloped surface 72 is also engageable with the surface of one of the links 36 in the generally axial position of the links as shown in the lower half of FIG. 2. Each of the drum segments 28 has a generally radial surface 74 adjacent the upper pin 38 of each of the end portions 32 for engagement by one of the links 36 in the generally radial direction, as shown in the upper half of FIG. 2. In this way the radial surface 74 on each of the drum segments 28 limits the movement of the links 36 and stabilizes the links in the fully expanded condition of the drum 10.

As shown in FIG. 2, the top turnup bladder 22 has a rib 76 which is clamped against the bladder support cylinder 24 by a ring 78 held against the bladder support cylinder 24 by screws 80 extending through the ring at circumferentially spaced positions and threaded in the bladder support cylinder. Each top turnup bladder 22 also has a flap member B2 extending over the end portion 32 of each of the drum segments 28 to an inner edge 84 abutting an outer edge 86 of the center sleeve 1B. Suitable means (not shown) are provided for clamping each inner edge 84 of each top turnup bladder 22 to an outer edge 86 of the center sleeve 18. The top turnup bladder 22 also has a seating flange 88 for positioning in the end portions 32 of the segments 28. It is understood that the size of the bead pockets 68 may be varied by modifying the shape of the end portions 32 of the drum segments 28 either by changing the end portions or providing inserts to partially fill the space in the end portions.

As shown in the upper half of FIG. 2, a bead 90 has been positioned over the bead pockets 68, the drum segments 28 expanded by rotating the screw 48 and the edges of the annular tire band 64 turned up by inflating the bottom turnup bladder 20 and top turnup bladder 22 at each end of the drum segments 28 to form the finished tire casing 66. Removal of the finished tire casing 66 may be accomplished by rotating the screw 48 causing the drum segments 28 to retract to the retracted condition shown in the bottom half of FIG. 2. Air pressure may be communicated to the holes 62 in each top turnup bladder 22 and center sleeve 18 to assist in separating the surfaces of the sleeves from the surface of the tire casing.

As shown in the bottom half of FIG. 2, the links 36 are in a generally axial direction; however, the outer pin 38 and inner pin 43 are not the same distance from the axis A—A so that the hub assemblies 34 can be moved axially with a reasonable force from the retracted position of the drum 10 to the expanded condition.

While a certain representative embodiment and details have been shown for the purpose of illustrating the invention, it will be apparent to those skilled in the art that various changes and modifications may be made therein without departing from the spirit or scope of the invention.

I claim:

1. A radially expanded tire building drum for building a small diameter tire with large bead portions comprising a rotatable hollow shaft mounted on a supporting structure, a pair of hub assemblies slidably mounted on said shaft for axial movement on opposite sides of a centerplane of said drum, a plurality of circumferentially spaced drum segments positioned radially outward of said shaft, each of said drum segments having a center portion and opposing end portions, a set of links pivotally connected to said hub assemblies and to said drum segments, bladder support members adjacent the end portions of said drum segments, a center sleeve of resilient material extending around the center portions of said drum segments, bottom turnup bladders mounted on said bladder support members, a right-hand/left-hand screw disposed coaxially in said shaft, nut members in threaded engagement with the left-hand portion and right-hand portion of said screw and being connected to said hub assemblies for moving said hub assemblies in opposite directions relative to said centerplane upon rotation of said screw, each of said links being movable between a generally axial position and a generally radial position to selectively expand and retract said drum segments between an expanded position and a retracted position, each of said end portions having a radially outer surface with a recess in said surface for a bead pocket so as to seat said large bead portions in said pocket at each end portion of said drum segments upon expansion of said center portion and said end portions of each of said drum segments by movement of said set of links.

2. A tire building drum according to claim 1 including resilient top turnup bladders extending around said bottom turnup bladders and over each of said end portions of said segments forming said pocket in each of said end portions.

3. A tire building drum according to claim 2 wherein said bottom turnup bladders and said top turnup bladders are inflatable and have means for connection with a pressurized air supply means for inflating said top turnup bladders and said bottom turnup bladders to turn up the edges of said tire.

4. A tire building drum according to claim 1 wherein each of said links in said generally axial position is located between said end portions of said drum segments whereby said end portions are movable into close proximity with said hub assemblies to provide a minimum diameter of said drum segments for placing a small diameter annular tire band over said drum segments when selectively retracted to the retracted position.

5. A tire building drum according to claim 4 wherein said links are connected to said drum segments by pivotal connections at said end portions, said end portions of said drum segments having sloped surfaces adjacent said pivotal connections for engaging said links in said generally axial position and said end portions having radially extending surfaces for engaging said links in said generally radial position of said links to limit the movement of said drum segments in the expanded and retracted positions of said drum segments.

6. A tire building drum according to claim 4 wherein said links are connected to said hub assemblies by pivotal connections and said hub assemblies have sloped surfaces adjacent said pivotal connections for engaging said links in said generally axial position to limit the movement of said drum segments in the retracted position of said drum segments.

7. A tire building drum according to claim 1 wherein said center portion of each of said drum segments has grooves for connection with a pressurized air supply means and a vacuum supply means, said center sleeve having openings adjacent said grooves for communication with said annular band to hold said band in place by a vacuum during building of said tire and to remove said tire by air pressure upon completion of said building operation.

8. A tire building drum according to claim 1 wherein a portion of each of said bladder support members is spaced radially outward of said shaft providing a space between said bladder support member portion and said shaft for sliding movement of one of said hub assemblies on said shaft.

* * * * *